United States Patent
Börjesson

[11] Patent Number: 6,148,983
[45] Date of Patent: Nov. 21, 2000

[54] DEVICE FOR VEHICLE TRANSMISSION

[75] Inventor: Tore Börjesson, Varberg, Sweden

[73] Assignee: Volvo Lastvagnar AB, Sweden

[21] Appl. No.: 09/331,355

[22] PCT Filed: Dec. 15, 1997

[86] PCT No.: PCT/SE97/02098

§ 371 Date: Aug. 20, 1999

§ 102(e) Date: Aug. 20, 1999

[87] PCT Pub. No.: WO98/29670

PCT Pub. Date: Jul. 9, 1998

[30] Foreign Application Priority Data

Dec. 19, 1996 [SE] Sweden ................................. 9604700

[51] Int. Cl.[7] .................................................. F16D 23/12
[52] U.S. Cl. ...................... 192/99 S; 192/98; 192/110 B; 192/115; 192/DIG. 1
[58] Field of Search ..................... 192/99 S, 98, 192/110 B, 115, 70.13, DIG. 1

[56] References Cited

U.S. PATENT DOCUMENTS

| | | | |
|---|---|---|---|
| 1,446,657 | 2/1923 | Parsons .................................. | 192/99 S |
| 4,655,335 | 4/1987 | Maruyamano et al. ............... | 192/99 S |
| 4,860,870 | 8/1989 | Romig .................................... | 192/99 S |
| 5,012,911 | 5/1991 | Kabayama ......................... | 192/99 S X |

FOREIGN PATENT DOCUMENTS

| | | |
|---|---|---|
| 0 094 001 A2 | 11/1983 | European Pat. Off. . |
| 29 35 079 A1 | 3/1981 | Germany . |
| 85 25 997 | 12/1985 | Germany . |
| 451 211 | 9/1987 | Sweden . |
| 2 177 772 | 1/1987 | United Kingdom . |

Primary Examiner—Richard M. Lorence
Attorney, Agent, or Firm—Lerner, David, Littenberg, Krumholz & Mentlik, LLP

[57] ABSTRACT

Apparatus is disclosed for use in a vehicle transmission including a clutch comprising an input shaft to a gearbox, a clutch release lever including a pair of shank ends on one end thereof, a pulling throwout bearing including a pair of engagement surfaces cooperating with the shank ends of the clutch release lever, the clutch release lever being rotatably mounted so that it can rotate between an assembly position during mounting of the gearbox onto the clutch wherein the pair of shank ends are displaced from the pulling throwout bearing during axial displacement of the gearbox towards the clutch, a rest position in which the pair of shank ends cooperatively engage the pulling throwout bearing, and a clutch release position. The pulling throwout bearing includes guiding surfaces which are adapted to engage the pair of shank ends when the clutch release lever is in the assembly position, and including a spherical radial bearing for rotatably mounting the clutch release lever about its axis of rotation whereby the clutch release lever rotate to the assembly position and the axis of rotation can be angularly adjusted so that the angle between the axis of rotation of the clutch release lever and the input shaft is not 90°.

4 Claims, 3 Drawing Sheets

DEVICE FOR VEHICLE TRANSMISSION

FIELD OF THE INVENTION

The present invention relates to a device for vehicle transmissions for maneuvering a vehicle clutch, i.e. switching between an engaged position and a disengaged position.

BACKGROUND OF THE INVENTION

A device for vehicle transmissions for the maneuvering of a vehicle clutch typically comprises the following components: a clutch release lever carried in the gearbox and cooperating with a throwout bearing which, in turn, actuates the clutch itself. The clutch release lever generally has two shanks which bear on engagement surfaces on the throwout bearing. The clutch is generally rotatably arranged on the same shaft as a flywheel while a clutch disc is pressed against the flywheel by a pressure plate which is spring-biased by a diaphragm spring. The pressure plate, in turn, is operated by the throwout bearing by means of the diaphragm spring. It is known to utilize a vehicle clutch having a pulling throwout bearing cooperating with a clutch release lever which is fastened on a rotatable axle. In clutches having pulling throwout bearings, the bearing is directly coupled to the clutch mechanism and, thus, to the engine, while the axle having the clutch release lever is carried in the gearbox housing. This division creates problems when joining the gearbox to the engine, for example in connection with repairs, when the gearbox has to be mounted onto an engine already installed in the vehicle. The problems are created by the fact that the shanks of the clutch release lever will have to be rotated in behind the engagement surfaces of the throwout bearing at the same time as the input shaft of the gearbox is inserted into a center of the clutch disc and a guiding sleeve is inserted into the throwout bearing. The rotating movement of the lever axle will then have to be coordinated with the axial displacement of the gearbox, which is difficult because the throwout bearing and the lever are hidden by a clutch bell-housing when they are in position for beginning such engagement. Thus, the mechanic cannot perform this synchronization in other ways than to feel his/her way without seeing the relative positions of the components.

According to Swedish Patent No. 451,211, a rotatable axle is carried in a clutch bell-housing using two fulcrum points. A clutch release lever is fastened to the axle and cooperates with a throwout bearing. By rotating the axle, the bearing will be subjected to a pulling force in the direction of disengagement by means of the lever. An intercepting device is connected with the bearing in order to catch the shanks of the lever, during joining of the gearbox to the engine, and to steer the ends of the lever into engagement with engagement surfaces of the throwout bearing. The intercepting device is formed by a brace made of spring steel. Because the clutch has been provided with an intercepting device, it is sufficient if the mechanic places the lever in a predetermined, downwardly angled mounting position. When the gearbox is then slid into place, the lever is automatically steered to the proper position behind the engagement surfaces of the throwout bearing. This construction is stable and provides a guaranteed operation, but it has the disadvantage that it cannot compensate for misalignment of the axle and mounting errors regarding the relative positions of the gearbox and engine. The consequence may be an uneven distribution of forces in the lever, which will result in increased wear and functional disturbances.

Alternative solutions to the problem associated with guiding the lever during mounting of a gearbox onto an engine, also called docking, have been proposed. They all have in common that they utilize some type of throwout bearing having a catch. The throwout bearing is installed temporarily on the input shaft of the gearbox, with the clutch release lever in its operating position, so that it is automatically fixedly snapped onto the diaphragm spring of the clutch during assembly. These solutions are distinguishably more expensive, and have an inferior reliability than the solution according to Swedish Patent No. 451,211.

In order to compensate for misalignment of the clutch release lever, the lever may be spherically carried in an axial uniball bearing. According to U.S. Pat. No. 4,860,870, the clutch release lever is mounted at a support point which has a cylindrical support surface which cooperates with a corresponding support surface on the clutch release lever. This arrangement is claimed to compensate for the misalignment which may occur during assembly or operation. These axial uniball bearings allow for limited movement in all directions, i.e. they cannot rotate a full revolution about any axis, which results in the lever not being capable of being angled sufficiently to allow for docking according to Swedish Patent No. 451,211. Therefore, a docking procedure according to the above described solution is required where a throwout bearing having a catch is utilized.

SUMMARY OF THE INVENTION

In accordance with the present invention, this and other objects have now been realized by the discovery of apparatus for use in a vehicle transmission including a clutch comprising an input shaft to a gearbox, a clutch release lever having a first end and a second end and a longitudinal axis therebetween, the first end of the clutch release lever including a pair of shank ends, a pulling throwout bearing including a pair of engagement surfaces for cooperating with the pair of shank ends of the clutch release lever, the clutch release lever being rotatably mounted about an axis of rotation, whereby the clutch release lever can rotate between an assembly position during mounting of the gearbox onto the clutch wherein the pair of shank ends are displaced from the pulling throwout bearing during axial displacement of the gearbox towards the clutch, a rest position wherein the pair of shank ends cooperatively engage the pulling throwout bearing, and a clutch release position, the pulling throwout bearing including intercepting means including guiding surfaces adapted to engage the pair of shank ends when the clutch release lever is in the assembly position, and including suspension means for rotatably mounting the clutch release lever about the axis of rotation, the suspension means comprising a spherical radial bearing whereby the clutch release lever can rotate to the assembly position and the axis of rotation can be angularly adjusted so that the angle between the axis of rotation of the clutch release lever and the input shaft is not 90°. In a preferred embodiment, the pulling throwout bearing includes a pair of diametrically opposed wing-shaped protrusions including the pair of engagement surfaces, and wherein the intercepting means comprises a metal wire loop having a first end and a second end, the first and second ends of the metal wire loop being disposed in the pair of opposed wing-shaped protrusions.

In accordance with one embodiment of the apparatus of the present invention, the intercepting means comprises an elastic member for spring-biasing the pair of shank ends towards the engagement surfaces of the pulling throwout bearing when the clutch release lever is in the rest position.

In accordance with another embodiment of the apparatus of the present invention, the spherical radial bearing comprises a spherical radial roller bearing.

A primary object of the present invention is to thus provide a device which compensates for the misalignment which might be present during assembly or operation of a gearbox on an engine, while simultaneously allowing the clutch release lever to be angled down sufficiently from the throwout bearing so that the clutch release lever and the throwout bearing do not collide during assembly of the gearbox to the engine.

BRIEF DESCRIPTION OF THE DRAWINGS

The present invention will be described in greater detail in the following detailed description, with reference to the annexed drawings, in which.

DETAILED DESCRIPTION

Figure 1:
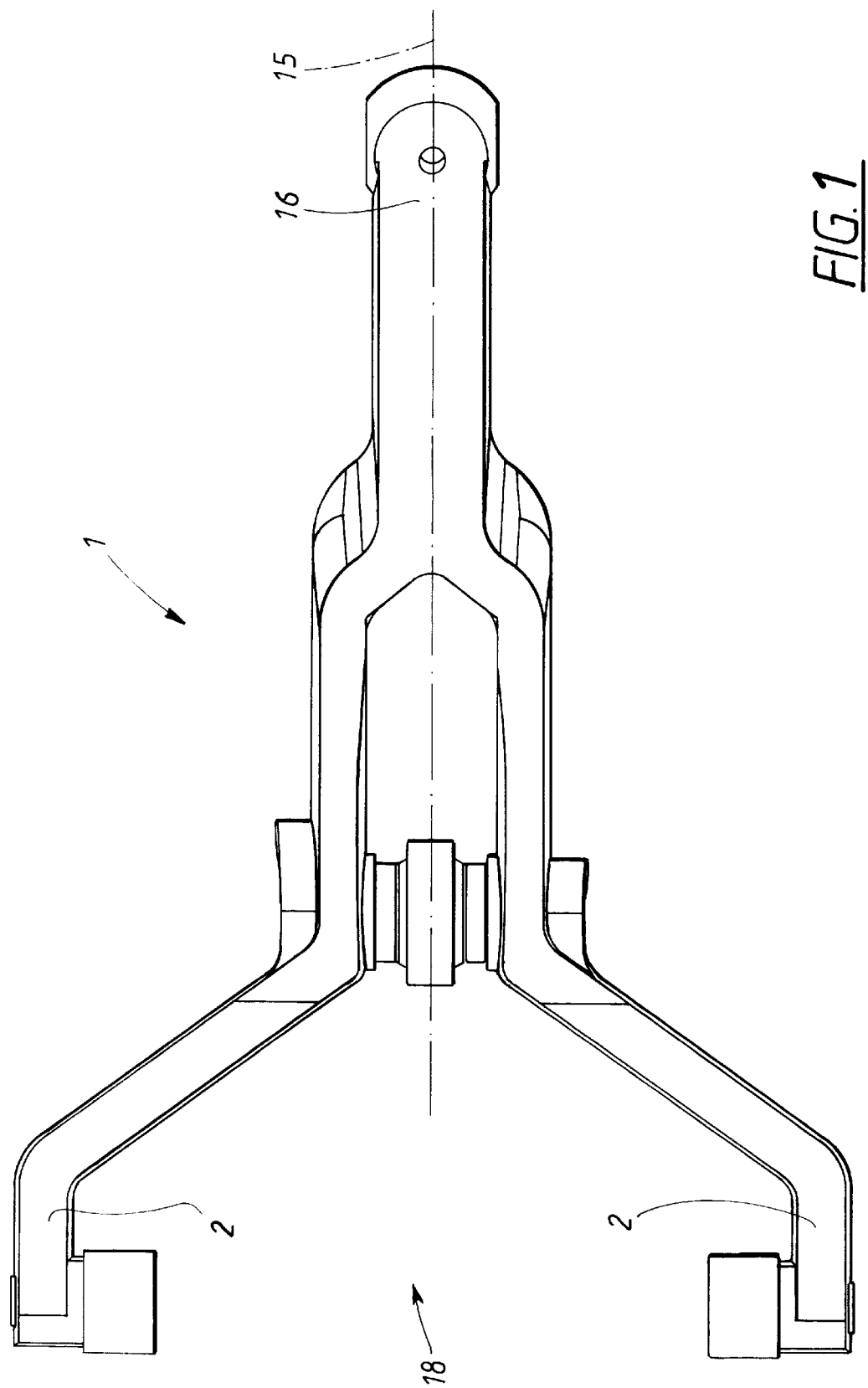
FIG. 1 is a top, elevational, schematic sectional view of a clutch release lever according to the present invention.

FIG. 1 shows a clutch release lever 1 according to the present invention. The clutch release lever 1 has a first end 18 which is forked into two shank ends 2, a second end 16, and a longitudinal axis 15 which runs from first end 18 to the second end 16.

Figure 3:
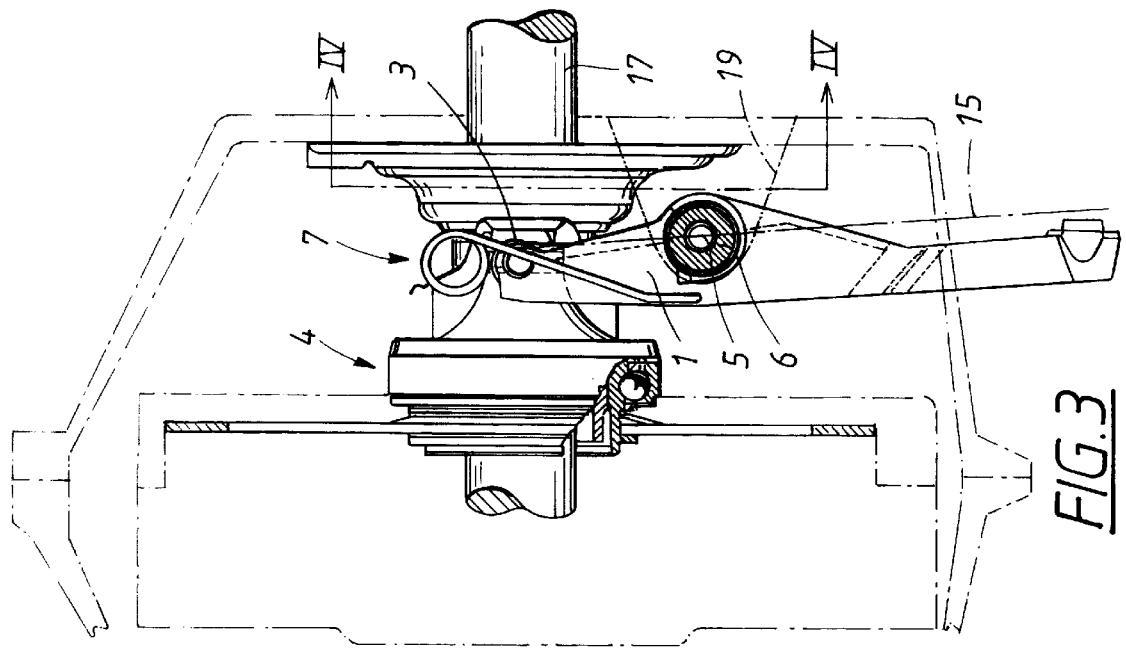
FIG. 3 is a side, elevational, partially sectional, schematic view of a part of a vehicle clutch, where the gearbox is fully slid in towards the clutch, according to the present invention.
Figure 2:
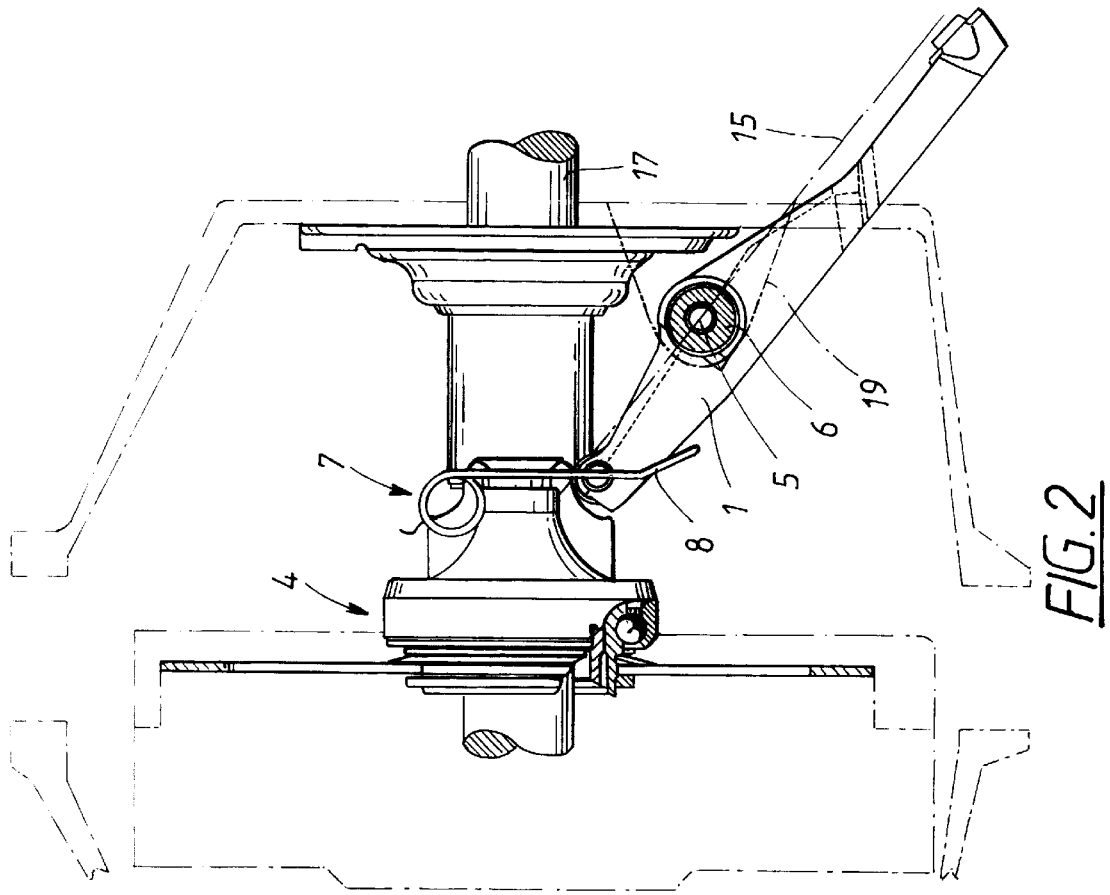
FIG. 2 is a side, elevational, partially sectional, schematic view of a part of a vehicle clutch, where the gearbox with a mounted clutch release lever is in a position to be slid in towards the clutch with a mounted throwout bearing, according to the present invention.

FIGS. 2 and 3 show a device according to the present invention for maneuvering the clutch of vehicle transmissions wherein the two shank ends 2 of a clutch release lever 1 cooperate with engagement surfaces 3 on a pulling throwout bearing 4. The clutch release lever 1 is rotatably arranged about an axis of rotation 5 using a suspension means 6 which is in the shape of a spherical radial bearing. The suspension means 6 is attached to a protrusion 19 from the gearbox, and this protrusion is marked with a broken line in FIGS. 2 and 3. Suspension means 6 makes it possible to rotate the clutch release lever 1, on the one hand to an assembly position during mounting of a gearbox with an affixed clutch release lever onto a clutch with an affixed throwout bearing 4, where the shank ends 2 are positioned so that they clear the throwout bearing 4 during axial displacement of the gearbox towards the clutch and, on the other hand, to rotate to a rest position where the shank ends 2 cooperate with the throwout bearing 4 and, lastly, to rotate from the rest position to a clutch release position. This suspension means 6 thus makes it possible to simultaneously rotate the clutch release lever 1 about the axis of rotation 5 and to angularly adjust it a predetermined angle with respect to the input shaft 17 of the gearbox, i.e. the angle between the input shaft 17 and the axis of rotation 5 will be able to differ from 90°.

The throwout bearing 4 is further provided with an intercepting device 7, which has guidance surfaces 8 which are arranged to catch the shank ends 2 of the clutch release lever, set in the assembly position, during connection of a gearbox having the clutch release lever 1 installed onto a clutch with an installed throwout bearing, when the gearbox is axially displaced towards the clutch and, during continued axial displacement, make the clutch release lever rotate about the axis of rotation 5 and steer the shank ends into engagement with the engagement surfaces of the throwout bearing. This latter position is shown in FIG. 3.

Figure 4:
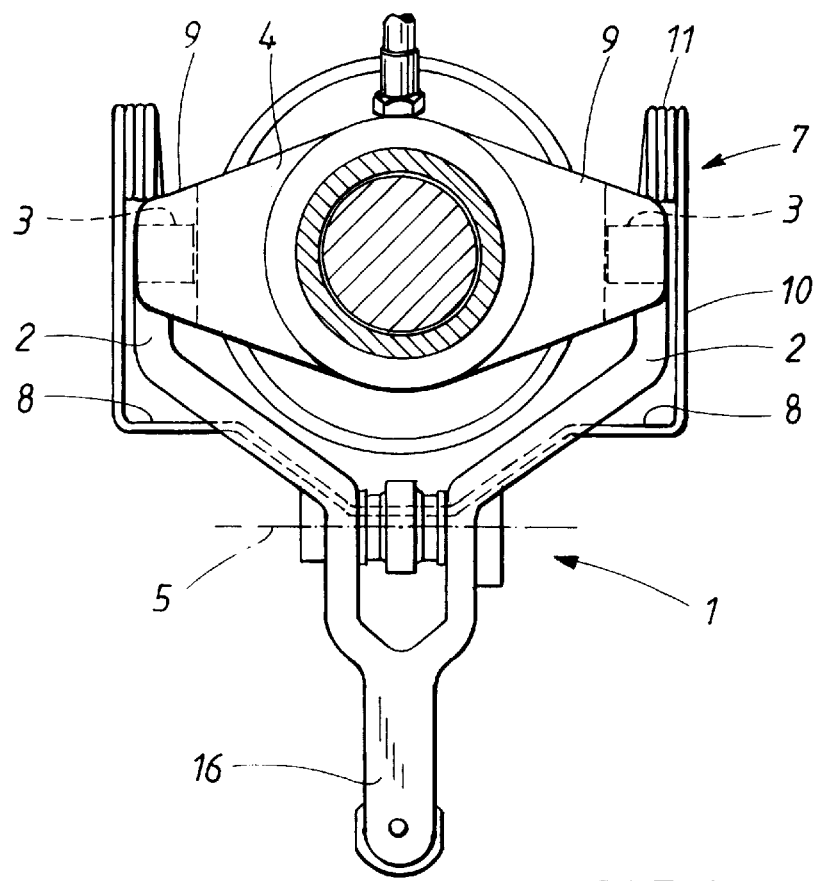
FIG. 4 is a top, elevational, partially sectional, schematic view along the line IV—IV of FIG. 3.

According to FIG. 4, the throwout bearing 4 has diametrically opposed wing-shaped protrusions 9 which have engagement surfaces 3 for cooperation with the two shank ends 2 of the clutch release lever. The intercepting device 7 consists of a metal wire loop 10 which has its ends fastened in the respective protrusions 9.

As is shown in FIGS. 2–4, the intercepting device 7 has elastic means 11, which, in the engaged position of the clutch release lever, spring-bias the shank ends 2 towards the engagement surfaces 3 of the throwout bearing. The metal wire loop 10 is advantageously made of spring steel and the elastic means 11 may comprise screw-wound parts.

Figure 5:
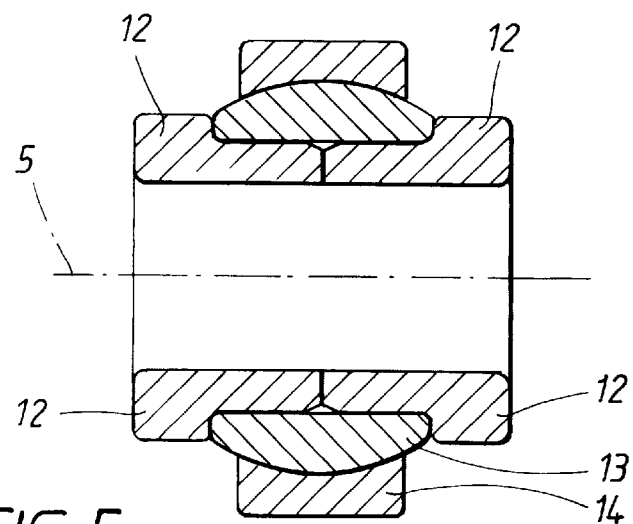
FIG. 5 is a top, elevational, sectional, schematic view of a typical, known spherical radial bearing.

A typical example of a known spherical radial bearings is shown in FIG. 5. These spherical radial bearings may be made as spherical ball bearings, spherical roller bearings or spherical slide bearings. A spherical slide bearing is shown in FIG. 5. A bearing of the spherical radial bearing type has three degrees of freedom for movements, one degree of freedom allows a complete revolution about a certain axis. According to the present invention, this degree of freedom is utilized for axial rotation of the clutch release lever about the axis of rotation 5, the other two degrees of freedom are utilized for inclination of the axis of rotation 5 of the clutch release lever so that the angle between the input shaft 17 of the gearbox and the axis of rotation 5 may differ from 90°. The bearing means for rotation of the clutch release lever 1 about the axis of rotation is marked 12. The bearing parts 13 and 14 cooperate to achieve a certain freedom, of movement for inclination of the axis of rotation 5 with respect to the input shaft 17 of the gearbox.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For example, the elastic means of the intercepting device does not have to be arranged as a wire loop, but may be made of, for example, spring steel strip.

What is claimed is:

1. Apparatus for use in a vehicle transmission including a clutch comprising an input shaft to a gearbox, a clutch release lever having a first end and a second end and a longitudinal axis therebetween, said first end of said clutch release lever including a pair of shank ends, a pulling throwout bearing including a pair of engagement surfaces for cooperating with said pair of shank ends of said clutch release lever, said clutch release lever being rotatably mounted about an axis of rotation, whereby said clutch release lever can rotate between an assembly position during mounting of said gearbox onto said clutch wherein said pair of shank ends are displaced from said pulling throwout bearing during axial displacement of said gearbox towards said clutch, a rest position wherein said pair of shank ends cooperatively engage said pulling throwout bearing, and a clutch release position, said pulling throwout bearing including intercepting means including guiding surfaces adapted to engage said pair of shank ends when said clutch release lever is in said assembly position, and including suspension means for rotatably mounting said clutch release lever about said axis of rotation, said suspension means comprising a spherical radial bearing whereby said clutch release lever can rotate to said assembly position and said axis of rotation can be angularly adjusted so that the angle between said axis of rotation of said clutch release lever and said input shaft is not 90°.

2. The apparatus of claim 1 wherein said pulling throwout bearing includes a pair of diametrically opposed wing-shaped protrusions including said pair of engagement surfaces, and wherein said intercepting means comprises a metal wire loop having a first end and a second end, said first and second ends of said metal wire loop being disposed in said pair of opposed wing-shaped protrusions.

3. The apparatus of claim 1 wherein said intercepting means comprises an elastic member for spring-biasing said pair of shank ends towards said engagement surfaces of said pulling throwout bearing when said clutch release lever is in said rest position.

4. The apparatus of claim 1 wherein said spherical radial bearing comprises a spherical radial roller bearing.

* * * * *